US011932029B2

(12) United States Patent
Takatori et al.

(10) Patent No.: US 11,932,029 B2
(45) **Date of Patent: *Mar. 19, 2024**

(54) TEMPERATURE ADJUSTMENT DEVICE FOR PRINTING MACHINE

(71) Applicant: Toyo Seikan Co., Ltd., Tokyo (JP)

(72) Inventors: Iori Takatori, Yokohama (JP); Ryouta Nagatsuka, Tokyo (JP); Osamu Hatano, Yokohama (JP); Tooru Shimomura, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 17/736,498

(22) Filed: May 4, 2022

(65) Prior Publication Data

US 2022/0258506 A1 Aug. 18, 2022

Related U.S. Application Data

(63) Continuation of application No. PCT/JP2020/035000, filed on Sep. 16, 2020.

(30) Foreign Application Priority Data

Nov. 12, 2019 (JP) ................................ 2019-204450

(51) Int. Cl.
*B41J 29/377* (2006.01)

(52) U.S. Cl.
CPC .................................. *B41J 29/377* (2013.01)

(58) Field of Classification Search
CPC ...................................................... B41J 29/377
See application file for complete search history.

(56) References Cited

U.S. PATENT DOCUMENTS 5,471,927 A * 12/1995 Frank .................... B41F 31/002 101/216
6,164,207 A 12/2000 Junghans
(Continued)

FOREIGN PATENT DOCUMENTS

JP 11-138758 A 5/1999
JP H11-138758 * 5/1999
(Continued)

OTHER PUBLICATIONS

Junghans, MachineTranslationofJPH11-188851(1999), 1999 (Year: 1999).*
(Continued)

*Primary Examiner* — Scott A Richmond
(74) *Attorney, Agent, or Firm* — WHDA, LLP

(57) ABSTRACT

An object of the present invention is to provide a temperature adjustment device for a printing machine with a plurality of inking devices mounted therein, the device being capable of adjusting the temperatures of ink smoothing function rollers in the respective inking devices uniformly and accurately. The temperature adjustment device for a printing machine according to the present invention is a temperature adjustment device for a printing machine that adjusts temperatures of rollers in a plurality of inking devices mounted in a printing machine by supplying temperature-regulated water to shaft parts of the rollers, and is characterized by having a plurality of smoothing function roller temperature regulators, provided respectively corresponding to the inking devices, and each adjusting the temperature of the ink smoothing function roller among a series of rollers in each of the inking devices.

10 Claims, 2 Drawing Sheets

(56) References Cited

U.S. PATENT DOCUMENTS

| | | | | |
|---|---|---|---|---|
| 2002/0178954 | A1* | 12/2002 | Hayashi | B41F 13/22<br>101/487 |
| 2007/0234909 | A1 | 10/2007 | Day | |
| 2012/0297999 | A1 | 11/2012 | Beier et al. | |

FOREIGN PATENT DOCUMENTS

| | | | |
|---|---|---|---|
| JP | 11-188851 | A | 7/1999 |
| JP | H11-188851 | * | 7/1999 |
| JP | 2002-347214 | A | 12/2002 |
| JP | 2009-298162 | A | 12/2009 |

OTHER PUBLICATIONS

Klhara, Machine TranslationofJPH11-138758, 1999 (Year: 1999).*
International Search Report dated Dec. 1, 2020, issued in counterpart International Application No. PCT/JP2020/035000. (2 pages).

* cited by examiner

TEMPERATURE ADJUSTMENT DEVICE FOR PRINTING MACHINE

TECHNICAL FIELD

The present invention relates to a temperature adjustment device for a printing machine, which adjusts the temperature of each of rollers in a plurality of inking devices mounted in the printing machine by supplying temperature-regulated water to shaft parts of the rollers.

BACKGROUND ART

A gradual temperature rise of inking rollers and printing plate surfaces due to friction heat generated during the operation of a printing machine results in a drop in ink viscosity, which adversely affects the print quality in various ways. In waterless lithography that is particularly susceptible to this issue, reduced ink viscosity resulting from increases in temperature lowers ink repellency and leads to a phenomenon called "scumming" on non-image areas of the printing plate. For this reason, a variety of temperature adjustment devices for printing machines, such as common offset printing machines, have hitherto been proposed for preventing temperature rises in inking devices or on printing plate surfaces.

Patent Literature 1, for example, discloses a temperature adjustment device for a printing machine, in which a piping system, in which temperature-regulated water flows through series of rollers in inking devices, is divided into a first line of piping system for adjusting the temperatures of ink supply function rollers and a second line of piping system for adjusting the temperatures of ink smoothing function rollers, with the first line of piping system and the second line of piping system being capable of adjusting the temperatures separately.

With such a temperature adjustment device for a printing machine, the printing machine is operable, with each of the ink supply function rollers and ink smoothing function rollers being maintained at optimal temperatures.

CITATION LIST

Patent Literature

[Patent Literature 1] Japanese Patent Application Publication No. 2002-347214

SUMMARY OF INVENTION

Technical Problem

However, in a printing machine in which a plurality of inking devices are mounted, there are large variations between the inking devices in terms of the temperatures of the ink smoothing function rollers, and it is difficult to uniformly and accurately adjust the temperatures of the ink smoothing function rollers in the respective inking devices even with the use of the temperature adjustment device described above. This causes the issues of scumming on the resultant printed item, and reduced color saturation due to poor ink color development.

The present invention has been made based on the circumstances described above, its object being to provide a temperature adjustment device for a printing machine with a plurality of inking devices mounted therein, the device being capable of adjusting the temperatures of ink smoothing function rollers in the respective inking devices uniformly and accurately.

Solution to Problem

The temperature adjustment device for a printing machine according to the present invention is a temperature adjustment device for a printing machine, which adjusts the temperatures of rollers in a plurality of inking devices mounted in a printing machine by supplying temperature-regulated water to shaft parts of the rollers, and is characterized by including a plurality of smoothing function roller temperature regulators, provided respectively corresponding to the inking devices, and each adjusting a temperature of an ink smoothing function roller among a series of rollers in each of the inking devices.

In the temperature adjustment device for a printing machine, preferably, each of the smoothing function roller temperature regulators may adjust a temperature of the ink smoothing function roller by adjusting a temperature and a flow rate of temperature-regulated water to be supplied.

In the temperature adjustment device for a printing machine, preferably, the ink smoothing function roller may include a vibrator roller and a form roller.

The temperature adjustment device may preferably include a plurality of temperature sensors, provided respectively corresponding to the inking devices, and each detecting a surface temperature of the form roller.

Each of the smoothing function roller temperature regulators may preferably adjust a temperature of the vibrator roller, based on a temperature detected by the corresponding temperature sensor.

The temperature adjustment device for a printing machine may preferably include a supply function roller temperature regulator that adjusts a temperature of an ink supply function roller among a series of rollers in each of the inking devices.

In the temperature adjustment device for a printing machine, preferably, the supply function roller temperature regulator may adjust a temperature of the ink supply function roller by adjusting a flow rate of temperature-regulated water to be supplied.

In the temperature adjustment device for a printing machine, the supply function roller temperature regulator may preferably be used in common by all the inking devices to adjust a temperature of each ink supply function roller.

In the temperature adjustment device for a printing machine, preferably, the ink supply function roller may include a fountain roller and a transfer roller.

The temperature adjustment device may include a plurality of temperature sensors, provided respectively corresponding to the inking devices, and each detecting a surface temperature of the transfer roller.

The supply function roller temperature regulator may preferably include a plurality of flow rate adjusting valves, provided respectively corresponding to the inking devices, and each adjusting a flow rate of the temperature-regulated water, and may adjust temperatures of the fountain roller and the transfer roller by adjusting a flow rate of temperature-regulated water to be supplied for each of the inking devices, based on a temperature detected by the corresponding temperature sensor.

In the temperature adjustment device for a printing machine, the supply function roller temperature regulator may be provided in plurality and respectively corresponding to the inking devices.

The temperature adjustment device for a printing machine may preferably include a hot water supply unit that supplies hot water of a preset temperature to the ink smoothing function roller when the printing machine comes to a temporary halt.

The temperature adjustment device for a printing machine may include a control unit that controls the smoothing function roller temperature regulators, the supply function roller temperature regulator, and the hot water supply unit.

The control unit may preferably have a function of executing control in a high-temperature mode in which the smoothing function roller temperature regulators are operated at a temperature set higher than a preset reference temperature, a middle-temperature mode in which the smoothing function roller temperature regulators are operated at a temperature set higher than the preset reference temperature and lower than a set temperature of the high-temperature mode, a normal operation mode in which the smoothing function roller temperature regulators are operated at the preset reference temperature, and a temporary stop mode in which when the printing machine comes to a temporary halt, operation of the smoothing function roller temperature regulators is stopped, as well as the hot water is supplied from the hot water supply unit to the ink smoothing function rollers.

The temperature adjustment device for a printing machine may preferably include a plate cylinder cooling unit that cools a plate cylinder in the printing machine by supplying a cooling medium to the plate cylinder.

Advantageous Effects of Invention

The temperature adjustment device for a printing machine according to the present invention is provided with a plurality of smoothing function roller temperature regulators corresponding to the plurality of inking devices for adjusting the temperatures of the ink smoothing function rollers, so that the temperatures of the ink smoothing function rollers in the respective inking devices can be adjusted separately. Consequently, the respective temperatures of the ink smoothing function rollers can be adjusted uniformly and accurately.

Moreover, with a configuration in which each of the smoothing function roller temperature regulators adjusts the temperature of the ink smoothing function roller by adjusting the temperature and the flow rate of temperature-regulated water to be supplied, the respective temperatures of the ink smoothing function rollers can be adjusted even more accurately.

With a configuration that includes the supply function roller temperature regulator that adjusts the temperatures of the ink supply function rollers in the respective inking devices, each of the ink supply function rollers and ink smoothing function rollers can be adjusted to optimal temperatures.

With a configuration that includes a hot water supply unit that supplies hot water of a preset temperature to the ink smoothing function rollers, a temperature drop of the ink smoothing function rollers when the printing machine has stopped temporarily is prevented or mitigated, so that the ink smoothing function rollers can be adjusted quickly to a desired temperature when the printing machine is restarted.

With a configuration that includes a control unit executing control in a high-temperature mode, a middle-temperature mode, a normal operation mode, and a temporary stop mode, the ink smoothing function rollers can be adjusted quickly to a desired temperature when the printing machine is started or restarted.

DESCRIPTION OF EMBODIMENTS

One embodiment of the temperature adjustment device for a printing machine according to the present invention will be hereinafter described in detail with reference to the drawings.

Figure 1:
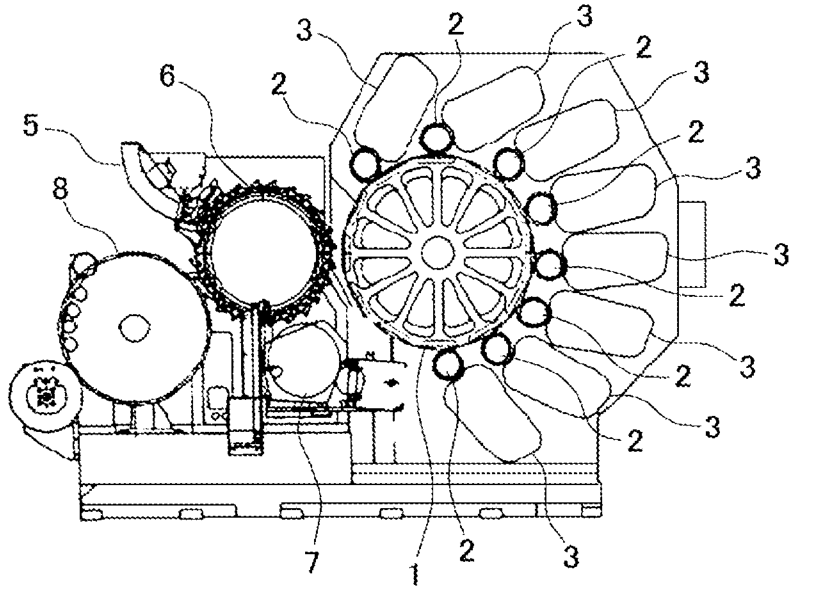
FIG. 1 is an illustrative diagram showing a configuration of a printing machine to which a temperature adjustment device of the present invention is applied.
Figure 2:
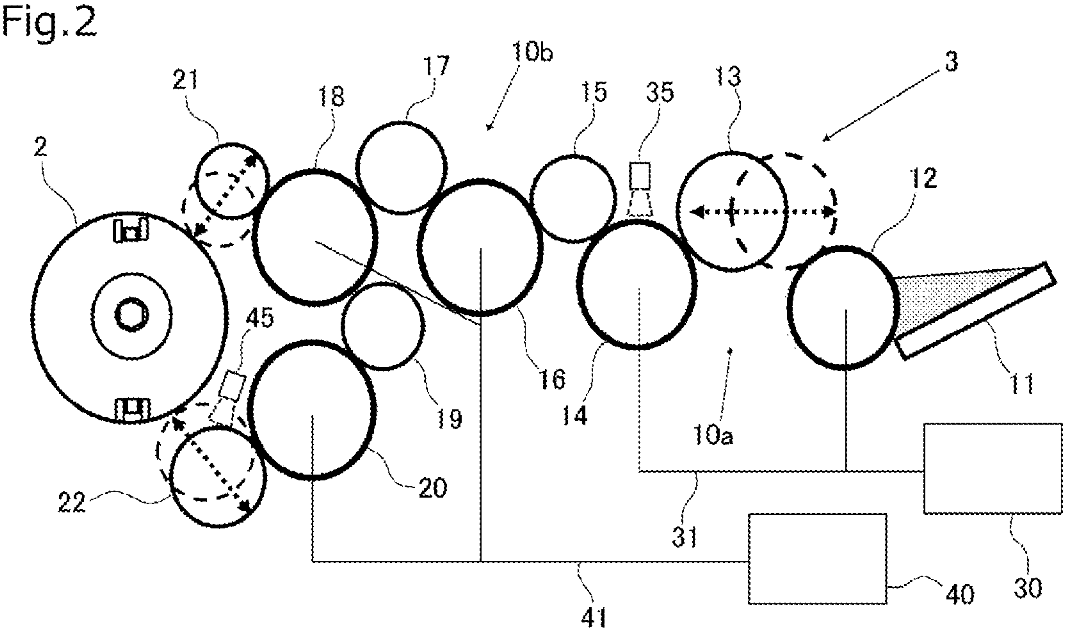
FIG. 2 is an illustrative diagram showing a configuration of an inking device in the printing machine shown in FIG. 1.
Figure 3:
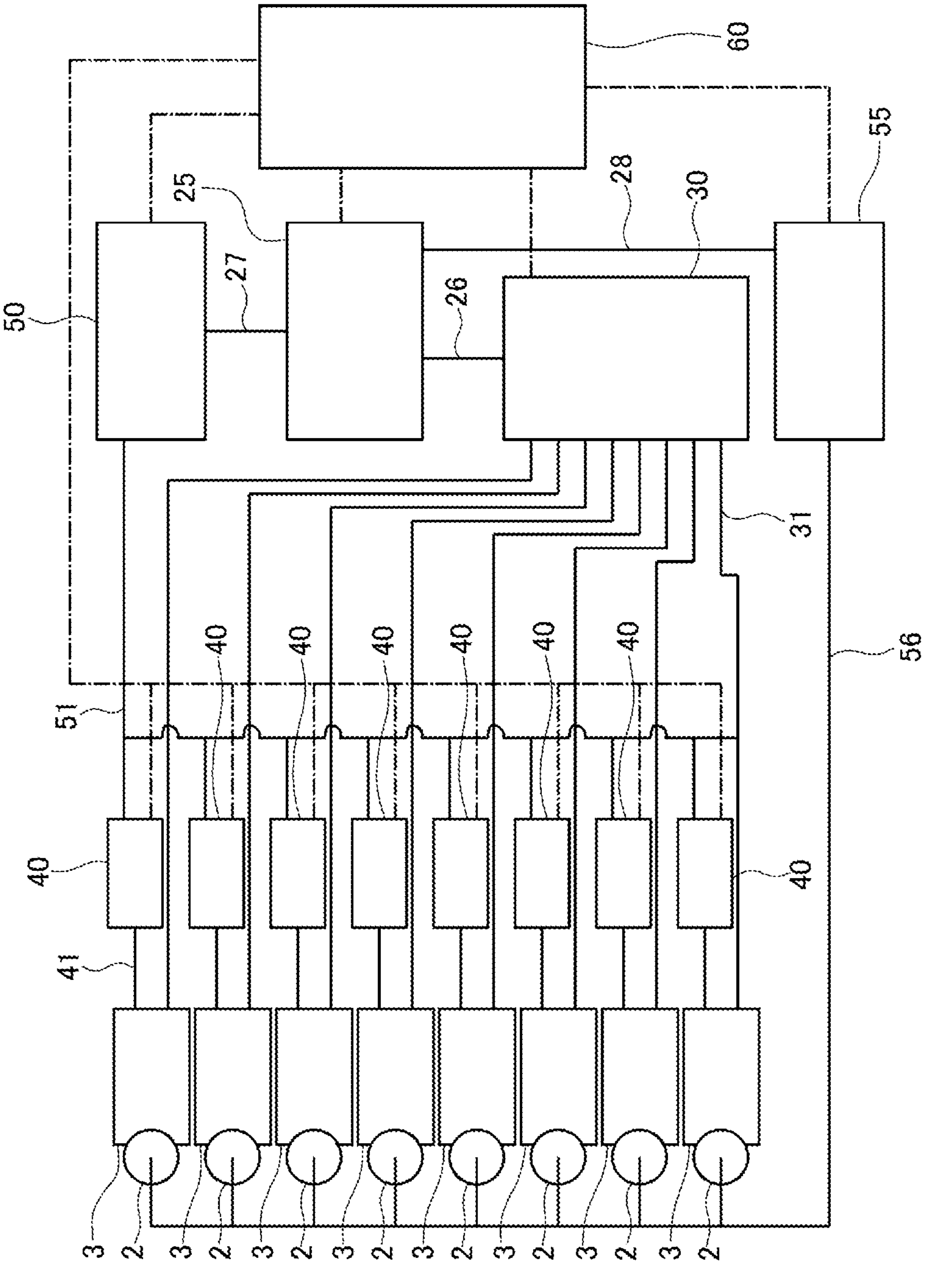
FIG. 3 is an illustrative diagram showing a schematic configuration of the temperature adjustment device for a printing machine of the present invention.

FIG. 1 is an illustrative diagram showing a configuration of a printing machine to which the temperature adjustment device of the present invention is applied. FIG. 2 is an illustrative diagram showing a configuration of an inking device in the printing machine shown in FIG. 1. FIG. 3 is an illustrative diagram showing a schematic configuration of the temperature adjustment device for a printing machine of the present invention.

The printing machine shown in FIG. 1 is a waterless lithographic press capable of 8-color overprinting, which is used for the printing on outer circumferential surfaces of can bodies, and has eight plate cylinders 2 disposed at fixed positions along the outer circumferential surface of a blanket wheel 1. An inking device 3 of each color is disposed in each of the plate cylinders 2 in this waterless lithographic press. In this waterless lithographic press, a plate of a designed image of each color is attached to each of the plate cylinders 2. As each plate cylinder 2 rotates, ink is transferred from the inking device 3 to the outer circumferential surface of each plate cylinder 2, and the ink adheres to the printing plate surface of each plate cylinder 2 at locations corresponding to image areas. Thus, as the blanket wheel 1 rotates, a surface of the blanket mounted on the blanket wheel 1 successively comes into contact with the plate surfaces of the rotating plate cylinders 2 so that a multicolor image is formed on the blanket surface.

Meanwhile, can bodies that are the printing target are supplied from an infeed chute 5 to a turret wheel 6, and, with the rotation of the turret wheel 6, transferred to mandrels of a mandrel wheel (not shown) to engage therewith. As the can bodies rotate and make contact with the rotating blanket wheel 1, the image formed on the blanket surface is transferred to and printed on the circumferential surface of the can bodies. In FIG. 1, reference numeral 7 denotes an applicator roller for applying a finishing varnish to the circumferential surface of the printed can body, and 8 denotes a transfer disc for transfer. After being printed and coated with finishing varnish, the can bodies are handed over from the mandrel wheel to the transfer disc for transfer 8 to be sent to the next process.

The inking device 3 of each color has an ink fountain 11 that is an ink supply source as illustrated in FIG. 2, and a series of rollers are provided between the ink fountain 11 and the plate cylinder 2. In the series of rollers, an ink supply function roller 10*a* having a function of supplying ink from the ink fountain 11 is disposed on an upstream side closer to the ink fountain 11, and an ink smoothing function roller 10*b* having a function of smoothing ink is disposed on a downstream side closer to the plate cylinder 2.

The ink supply function roller 10*a* includes a fountain roller 12, a ductor roller 13, and a transfer roller 14 disposed in this order from the upstream side to the downstream side.

The ink smoothing function roller 10*b* includes three vibrator rollers 16, 18, and 20. A distributer roller 15 is disposed between the vibrator roller 16 on the upstream side and the transfer roller 14 of the ink supply function roller 10*a*. Distributer rollers 17 and 19 are disposed between the vibrator rollers 16 and 18, and the vibrator rollers 18 and 20, respectively. A form roller 21 is disposed between the vibrator roller 18 and the plate cylinder 2, and a form roller 22 is disposed between the vibrator roller 20 and the plate cylinder 2.

The illustrated example of a temperature adjustment device for a printing machine (hereinafter referred to also simply as "temperature adjustment device") includes a cold water heat source 25 having a cold water tank that stores cold water, a single supply function roller temperature regulator 30 that supplies temperature-regulated water to ink supply function rollers 10*a* among the series of rollers in the respective inking devices 3 to adjust the temperatures of the ink supply function rollers 10*a*, a plurality of smoothing function roller temperature regulators 40 that supply temperature-regulated water to the ink smoothing function rollers 10*b* to adjust the temperatures of the ink smoothing function rollers 10*b*, a hot water supply unit 50 having a hot water tank that stores hot water of a predetermined temperature, a plate cylinder cooling unit 55 that cools each of the plate cylinders 2, and a control unit 60 that controls these units.

The cold water tank in the cold water heat source 25 stores cold water of a predetermined temperature. The temperature of this cold water is, for example, 7 to 13° C.

The cold water heat source 25 is provided with three cold water supply pipes 26, 27, and 28. The supply function roller temperature regulator 30 is connected to the cold water supply pipe 26, the hot water supply unit 50 is connected to the cold water supply pipe 27, and the plate cylinder cooling unit 55 is connected to the cold water supply pipe 28.

All the inking devices 3 use the one common supply function roller temperature regulator 30, which adjusts the temperature of each ink supply function roller 10*a*. This supply function roller temperature regulator 30 includes, in its temperature-regulated water piping system provided inside, a pump (not shown) and a heater (not shown) disposed in series in this order from the upstream side to the downstream side. Downstream of the heater are connected a plurality of (eight in the illustrated example) temperature-regulated water supply pipes 31 branched corresponding to the inking devices 3. The temperature-regulated water supply pipes 31 are each connected to shaft parts of the fountain roller 12 and transfer roller 14 that are the ink supply function rollers 10*a* of corresponding inking devices 3. Although not shown, return pipes are provided to the supply function roller temperature regulator 30 for conveying the temperature-regulated water supplied to the shaft parts of the fountain roller 12 and transfer roller 14 back into the supply function roller temperature regulator 30, to allow use of the temperature-regulated water in circulation.

The supply function roller temperature regulator 30 adjusts the flow rate of the temperature-regulated water to be supplied to regulate the temperature of the ink supply function roller 10*a* in each of the inking devices 3. In this example, each of the temperature-regulated water supply pipes 31 is provided with a flow rate adjusting valve (not shown) that adjusts the flow rate of the temperature-regulated water, so that the flow rate of the temperature-regulated water supplied to each of the inking devices 3 can be separately adjusted. Specifically, each of the inking devices 3 has a non-contact temperature sensor 35 disposed inside for detecting the surface temperature of the transfer roller 14, and the flow rate of the temperature-regulated water to be supplied is adjusted in each inking device 3 based on the temperature detected by this temperature sensor 35 and a preset reference temperature of the ink supply function roller 10*a*.

This preset reference temperature is set suitably in consideration of a target temperature of the form roller 22 in the inking device 3, an ambient temperature, the printing method of the printing machine, and so on. To give a concrete example, the preset reference temperature S1 may be in the range of from T−3° C. to T+1° C., where T represents the target temperature of the form roller 22.

The preset reference temperature for the ink supply function rollers 10*a* set at the supply function roller temperature regulator 30 should preferably be higher than a preset reference temperature for the ink smoothing function rollers 10*b* set at smoothing function roller temperature regulators 40 to be described later. The preset reference temperature for the ink supply function rollers 10*a* set high at the supply function roller temperature regulator 30 increases the flowability of ink and facilitates rolling out of ink from the ink fountain 11.

The temperature-regulated water supplied from the supply function roller temperature regulator 30 is adjusted to a predetermined temperature through operation of the heater or adjustment of the amount of cold water introduced from the cold water heat source 25. This temperature of the temperature-regulated water is set suitably in consideration of a target temperature T of the form roller 22 in the inking device 3, an ambient temperature, the printing method of the printing machine, and so on.

There are provided a plurality of smoothing function roller temperature regulators 40, each corresponding to each of the inking devices 3. In the illustrated example, the printing machine has eight inking devices, and therefore there are provided eight smoothing function roller temperature regulators 40.

Each of the smoothing function roller temperature regulators 40 includes, in its temperature-regulated water piping system provided inside, a pump (not shown) and a heater (not shown) disposed in series in this order from the upstream side to the downstream side. Downstream of the heater is connected a temperature-regulated water supply pipe 41. Each temperature-regulated water supply pipe 41 is connected to the respective shaft parts of three vibrator rollers 16, 18, and 20 in the smoothing function roller temperature regulator 40 of the corresponding inking device 3. Although not shown, return pipes are provided to each of the smoothing function roller temperature regulators 40 for conveying the temperature-regulated water supplied to the shaft parts of the vibrator rollers 16, 18, and 20 back into the corresponding smoothing function roller temperature regulators 40, to allow use of the temperature-regulated water in circulation.

Each of the smoothing function roller temperature regulators 40 adjusts the temperature and flow rate of the temperature-regulated water to be supplied, to regulate the temperature of the ink smoothing function roller 10*b* of the corresponding inking device 3. Each of the temperature-regulated water supply pipes 41 is provided with a flow rate adjusting valve (not shown) that adjusts the flow rate of the temperature-regulated water, so that the flow rate of the temperature-regulated water supplied to each of the inking devices 3 can be separately adjusted by each smoothing function roller temperature regulator 40.

Each of the smoothing function roller temperature regulators 40 is connected to the hot water supply unit 50 via a piping system 51, so that the temperature-regulated water supplied from the smoothing function roller temperature regulators 40 is adjusted to a required temperature through operation of the heater or adjustment of the amount of cold water introduced from the cold water heat source 25.

Specifically, each of the inking devices 3 has a non-contact temperature sensor 45 disposed inside for detecting the surface temperature of the form roller 22, and the temperature and flow rate of the temperature-regulated water to be supplied are adjusted in each inking device 3 based on the temperature detected by this temperature sensor 45 and a preset reference temperature of the ink smoothing function roller 10*b*.

The preset reference temperature for the ink smoothing function roller 10*b* set at the smoothing function roller temperature regulator 40 is suitably set in consideration of a target temperature of the form roller 22 in the inking device 3, an ambient temperature, the printing method of the printing machine, and so on. To give a concrete example, the preset reference temperature S2 may be in the range of from T−8° C. to T−4° C., where T represents the target temperature of the form roller 22.

The hot water supply unit 50 supplies hot water of a preset temperature to the ink smoothing function rollers 10*b* in the respective inking devices 3 when the printing machine has stopped temporarily. Specifically, the hot water supply unit 50 is connected to each of the temperature-regulated water supply pipes 41 via the piping system 51 and piping systems provided in the respective smoothing function roller temperature regulators 40. When the printing machine comes to a temporary halt, the supply of temperature-regulated water by the smoothing function roller temperature regulators 40 stops, and at the same time, hot water is supplied from the hot water supply unit 50 to the vibrator rollers 16, 18, and 20 that are the ink smoothing function rollers 10*b* via the temperature-regulated water supply pipes 41. A heater (not shown) is provided in the hot water supply unit 50 so that the hot water stored in the hot water tank is kept at a predetermined temperature by the operation of this heater. The temperature of the hot water is set in accordance with, for example, the target temperature of the form rollers 22 in the inking devices 3. To give a concrete example, the temperature is in the range of 35 to 38° C.

The plate cylinder cooling unit 55 supplies a cooling medium to each of the plate cylinders 2 to cool the plate cylinders 2. The plate cylinder cooling unit 55 in this example uses the air as the cooling medium. To be more concrete, this plate cylinder cooling unit 55 is provided with a heat exchanger inside, and by circulating the cold water from the cold water heat source 25 to this heat exchanger, the air is cooled to a predetermined temperature. This cooled air is supplied to each of the plate cylinders 2 through a piping system 56 so that each plate cylinder 2 is cooled. The temperature of the air supplied to the plate cylinders 2 is, for example, 15 to 22° C.

The operations of the cold water heat source 25, supply function roller temperature regulator 30, smoothing function roller temperature regulators 40, hot water supply unit 50, and plate cylinder cooling unit 55 are controlled by the control unit 60. The control unit 60 in this example has a function of executing control in a high-temperature mode in which the smoothing function roller temperature regulators 40 are operated at a temperature set higher than the preset reference temperature, a middle-temperature mode in which the smoothing function roller temperature regulators 40 are operated at a temperature set higher than the preset reference temperature and lower than the set temperature of the high-temperature mode, a normal operation mode in which the smoothing function roller temperature regulators are operated at the preset reference temperature, and a temporary stop mode in which, when the printing machine comes to a temporary halt, the operation of the smoothing function roller temperature regulators 40 is stopped and hot water is supplied from the hot water supply unit 50 to the ink smoothing function rollers 10*b*.

The high-temperature mode is a mode used when starting the operation of the printing machine, or when restarting the printing machine after it has been sopped for a long time. The set temperature for the smoothing function roller temperature regulators 40 in the high-temperature mode is S2+3° C., for example, where S2° C. is the preset reference temperature. The operation time in the high-temperature mode is 50 to 90 seconds, for example.

In this high-temperature mode, the supply function roller temperature regulator 30 should preferably be operated at a temperature set higher than the preset reference temperature, and the air supplied from the plate cylinder cooling unit 55 to the plate cylinders 2 should preferably be at a higher temperature than that of the normal operation.

The middle-temperature mode is a mode used after the high-temperature mode has ended, or when restarting the printing machine after it has been sopped for a short time. The set temperature for the smoothing function roller temperature regulators 40 in the middle-temperature mode is S2+2° C., for example, where S2° C. is the preset reference temperature. The operation time in the middle-temperature mode is 50 to 90 seconds, for example.

In this middle-temperature mode, the supply function roller temperature regulator 30 should preferably be operated at a temperature set higher than the preset reference temperature and lower than the set temperature of the high-temperature mode, and the air supplied from the plate cylinder cooling unit 55 to the plate cylinders 2 should preferably be at a temperature higher than that of the normal operation and lower than that of the high-temperature mode.

In the temporary stop mode, the supply of temperature-regulated water by the smoothing function roller temperature regulators 40 stops, and at the same time, a predetermined amount of hot water is supplied from the hot water supply unit 50 to the ink smoothing function rollers 10*b*. The amount of hot water supplied from the hot water supply unit 50 is 20 L, for example. The flow rate and duration of supply of hot water are set suitably. For example, the flow rate of hot water is 100 L/min, and the duration of supply of the hot water is 10 to 15 seconds.

In the temperature adjustment device for a printing machine described above, when the printing machine is started, the supply function roller temperature regulator 30, smoothing function roller temperature regulators 40, and plate cylinder cooling unit 55 are started to operate, and the operations of these units are controlled by the control unit 60 in the high-temperature mode at the start, followed by control in the middle-temperature mode, and thereafter in the normal operation mode.

In each mode, the supply function roller temperature regulator 30 supplies temperature-regulated water of a predetermined temperature to the fountain roller 12 and transfer roller 14, and the temperatures of the fountain roller 12 and transfer roller 14 are regulated by adjusting the flow rate of the temperature-regulated water based on the temperature detected by the temperature sensor 35 and the set temperature. Meanwhile, the smoothing function roller temperature regulators 40 supply temperature-regulated water to the vibrator rollers 16, 18, and 20, and the temperatures of the vibrator rollers 16, 18, and 20 are regulated by adjusting the flow rate and the temperature of the temperature-regulated water based on the temperature detected by the temperature sensor 45 and the set temperature. Further, the plate cylinder cooling unit 55 supplies the cooled air to the plate cylinders 2 so that the plate cylinders 2 are cooled.

When the printing machine comes to a temporary halt, the temporary stop mode executed by the control unit 60 stops the operation of the smoothing function roller temperature regulators 40, and supplies a predetermined amount of hot water to the vibrator rollers 16, 18, and 20 from the hot water supply unit 50. After that, when the printing machine is restarted, the supply function roller temperature regulator 30, smoothing function roller temperature regulators 40, and plate cylinder cooling unit 55 again start to adjust the temperatures of the series of rollers and plate cylinders 2 in the inking devices 3. At this time, when the printing machine has been stopped for a long time, the supply function roller temperature regulator 30, smoothing function roller temperature regulators 40, and plate cylinder cooling unit 55 are controlled to operate in the order of the high-temperature mode, middle-temperature mode, and normal operation mode, similarly to the initial operation of the printing machine. On the other hand, when the printing machine has been stopped for a short time, the high-temperature mode is skipped, and the supply function roller temperature regulator 30, smoothing function roller temperature regulators 40, and plate cylinder cooling unit 55 are controlled to operate in the order of the middle-temperature mode and normal operation mode.

When the printing machine described above stops, no friction heat is generated. Therefore, if the smoothing function roller temperature regulators 40 continue to supply the temperature-regulated water, the temperatures of the vibrator rollers 16, 18, and 20 will drop quickly. This will require a considerably long time to make the temperatures of the vibrator rollers 16, 18, and 20 stable when the printing machine is restarted. However, the temporary stop mode stops the supply of the temperature-regulated water from the smoothing function roller temperature regulators 40, while supplying hot water to the vibrator rollers 16, 18, and 20 from the hot water supply unit 50, so that the temperatures of the vibrator rollers 16, 18, and 20 are maintained. Consequently, when the printing machine is restarted, the temperatures of the vibrator rollers 16, 18, and 20 can quickly be made stable.

As described above, the temperature adjustment device for a printing machine according to the present invention is provided with a plurality of smoothing function roller temperature regulators 40 corresponding to the plurality of inking devices 3 for adjusting the temperatures of the ink smoothing function rollers 10*b*, so that the temperatures of the ink smoothing function rollers 10*b* in the respective inking devices 3 can be adjusted separately. Consequently, the respective temperatures of the ink smoothing function rollers 10*b* can be adjusted uniformly and accurately.

Moreover, since each of the smoothing function roller temperature regulators 40 adjusts the temperature and flow rate of the temperature-regulated water to be supplied to adjust the temperature of the ink smoothing function roller 10*b*, the respective temperatures of the ink smoothing function rollers 10*b* can be adjusted even more accurately.

Moreover, the supply function roller temperature regulator 30 provided to adjust the temperature of the ink supply function roller 10*a* in each of the inking devices 3 enables adjustment of each of the ink supply function rollers 10*a* and ink smoothing function rollers 10*b* to an optimal temperature.

Moreover, since there is provided the hot water supply unit 50 that supplies hot water of a preset temperature to the ink smoothing function rollers 10*b*, a temperature drop of the ink smoothing function rollers 10*b* when the printing machine has stopped temporarily is prevented or mitigated by the supply of hot water from the hot water supply unit 50, so that the ink smoothing function rollers can be adjusted quickly to a desired temperature when the printing machine is restarted.

Moreover, the control unit 60 has the function of executing control in a high-temperature mode, a middle-temperature mode, a normal operation mode, and a temporary stop mode, so that the ink smoothing function rollers 10*b* can be adjusted quickly to a desired temperature when the printing machine is started or restarted.

While one embodiment of the temperature adjustment device of the present invention has been described above, the present invention is not limited to the embodiment described above and various changes may be made.

For example, there may be provided a plurality of supply function roller temperature regulators, each corresponding to each of the inking devices.

While the plate cylinder cooling unit in the example described above is an air-cooled type that uses the air as the cooling medium, a water-cooled plate cylinder cooling unit that uses water as the cooling medium may also be used.

Experimental Example

A waterless lithographic press was operated, with the temperatures of the series of rollers in the inking devices of the printing machine being adjusted under the following conditions, using the temperature adjustment device of the present invention.

Target temperature of the form roller (22)=36° C.

High-Temperature Mode:

Set temperature of the supply function roller temperature regulator (30)=37° C. (temperature of the temperature-regulated water=37° C.)

Set temperature of the smoothing function roller temperature regulators (40)=33° C. (initial flow rate of the temperature-regulated water=12.5 L/min)

The temperature of the air supplied from the plate cylinder cooling unit 55=22° C.

Middle-Temperature Mode:

Set temperature of the supply function roller temperature regulator (30)=36° C. (temperature of the temperature-regulated water=36° C.)

Set temperature of the smoothing function roller temperature regulators (40)=32° C. (initial flow rate of the temperature-regulated water=12.5 L/min)

The temperature of the air supplied from the plate cylinder cooling unit 55=20° C.

Normal Operation Mode:

Set temperature of the supply function roller temperature regulator (30)=35° C. (temperature of the temperature-regulated water=35° C.)

Set temperature of the smoothing function roller temperature regulators (40)=30° C. (initial flow rate of the temperature-regulated water=12.5 L/min)

The temperature of the air supplied from the plate cylinder cooling unit 55=15° C.

After the temperatures of the form rollers (22) in the respective inking devices have stabilized, the temperature of each form roller (22) was measured. The maximum value was 38.2° C., and the minimum value was 35.0° C., i.e., the temperature variation among the form rollers (22) was 3.2° C. No scumming was observed on the surface of the resultant printed item (can body). The ink color development by each inking device was favorable, and no color turbidity was detected.

The waterless lithographic press was also operated, with the temperatures of the series of rollers in the inking devices of the printing machine being adjusted using the temperature adjustment device described in Patent Literature 1, and the temperatures of the form rollers were measured. The maximum value was 44.8° C., and the minimum value was 32.4° C., i.e., the temperature variation among the form rollers was 12.4° C. Scumming was observed on the surface of the resultant printed item (can body). The ink color development of some colors such as green was not favorable, and color turbidity was detected in yellow and orange.

REFERENCE SIGNS LIST

1 Blanket wheel
2 Plate cylinder
3 Inking device
5 Infeed chute
6 Mandrel wheel
7 Applicator roller
8 Transfer disc
10*a* Ink supply function roller
10*b* Ink smoothing function roller
11 Ink fountain
12 Fountain roller
13 Ductor roller
14 Transfer roller
15, 17, 19 Distributer roller
16, 18, 20 Vibrator roller
21, 22 Form roller
25 Cold water heat source
26, 27, 28 Piping system
30 Supply function roller temperature regulator
31 Temperature-regulated water supply pipe
35 Temperature sensor
40 Smoothing function roller temperature regulator
41 Temperature-regulated water supply pipe
45 Temperature sensor
50 Hot water supply unit
51 Piping system
55 Plate cylinder cooling unit
56 Piping system
60 Control unit

The invention claimed is:

1. A temperature adjustment device for a printing machine, which adjusts temperatures of rollers in a plurality of inking devices mounted in the printing machine by supplying temperature-regulated water to shaft parts of the rollers, the temperature adjustment device comprising:

a plurality of smoothing function roller temperature regulators, provided respectively corresponding to the inking devices, and each adjusting a temperature of an ink smoothing function roller among a series of rollers in each of the inking devices;

a hot water supply unit that supplies hot water of a preset temperature to the ink smoothing function roller when the printing machine comes to a temporary halt; and a control unit that controls the smoothing function roller temperature regulators and the hot water supply unit, wherein the control unit has a function of executing control in a high-temperature mode in which the smoothing function roller temperature regulators are operated at a temperature set higher than a preset reference temperature, a middle-temperature mode in which the smoothing function roller temperature regulators are operated at a temperature set higher than the preset reference temperature and lower than a set temperature of the high-temperature mode, a normal operation mode in which the smoothing function roller temperature regulators are operated at the preset reference temperature, and a temporary stop mode in which when the printing machine comes to a temporary halt, operation of the smoothing function roller temperature regulators is stopped, as well as the hot water is supplied from the hot water supply unit to the ink smoothing function rollers.

2. The temperature adjustment device for a printing machine according to claim 1, wherein each of the smoothing function roller temperature regulators adjusts a temperature of the ink smoothing function roller by adjusting a temperature and a flow rate of temperature-regulated water to be supplied.

3. The temperature adjustment device for a printing machine according to claim 1, wherein the ink smoothing function roller includes a vibrator roller and a form roller, the temperature adjustment device further comprising a plurality of temperature sensors, provided respectively corresponding to the inking devices, and each detecting a surface temperature of the form roller, wherein each of the smoothing function roller temperature regulators adjusts a temperature of the vibrator roller, based on a temperature detected by the corresponding temperature sensor.

4. The temperature adjustment device for a printing machine according to claim 1, comprising a supply function roller temperature regulator that adjusts a temperature of an ink supply function roller among a series of rollers in each of the inking devices.

5. The temperature adjustment device for a printing machine according to claim 4, wherein the supply function roller temperature regulator adjusts a temperature of the ink supply function roller by adjusting a flow rate of temperature-regulated water to be supplied.

6. The temperature adjustment device for a printing machine according to claim 4, wherein the supply function roller temperature regulator is used in common by all the inking devices to adjust a temperature of each ink supply function roller.

7. The temperature adjustment device for a printing machine according to claim 4, wherein the control unit controls the supply function roller temperature regulator.

8. The temperature adjustment device for a printing machine according to claim 6, wherein the ink supply function roller includes a fountain roller and a transfer roller, the temperature adjustment device further comprising a plurality of temperature sensors, provided respectively corresponding to the inking devices, and each detecting a surface temperature of the transfer roller, wherein the supply function roller temperature regulator includes a plurality of flow rate adjusting valves that are provided respectively corresponding to the inking devices and that each adjust a flow rate of the temperature-regulated water, and adjusts temperatures of the fountain roller and the transfer roller by adjusting a flow rate of temperature-regulated water to be supplied for each of the inking devices, based on a temperature detected by the corresponding temperature sensor.

9. The temperature adjustment device for a printing machine according to claim 4, comprising the supply function roller temperature regulator provided in plurality and respectively corresponding to the inking devices.

10. The temperature adjustment device for a printing machine according to claim 1, comprising a plate cylinder cooling unit that cools a plate cylinder in the printing machine by supplying a cooling medium to the plate cylinder.

* * * * *